United States Patent Office 3,153,014
Patented Oct. 13, 1964

3,153,014
MALEIMIDES AND CITRACONIMIDES AS CURING AGENTS FOR VULCANIZABLE RUBBERS
Harry H. Fletcher, Nutley, and Julian R. Little, Wayne, N.J., assignors to United States Rubber Company, New York, N.Y., a corporation of New Jersey
No Drawing. Original application May 7, 1959, Ser. No. 811,532. Divided and this application May 6, 1960, Ser. No. 27,278
18 Claims. (Cl. 260—78)

This invention relates to a new method of vulcanizing highly unsaturated rubbers, and to the rubbery vulcanized products so made. The method of the present invention broadly comprises heating an unvulcanized rubber in admixture with a curing agent which is monomaleimide, monocitraconimide, or a N-substituted derivative of either of these parent compounds having but one imido N atom. Preferably, the vulcanization is accelerated with a thiazole-type accelerator, or, in some cases, with a free-radical generator such as an organic peroxide or an aliphatic azo compound. When the rubber is synthetic, the desirable physical characteristics of the vulcanizate are enhanced by employing a filler. This application is a division of Serial No. 811,532, filed May 7, 1959, now abandoned.

Most of the N-substituted monomaleimides which are used in this invention can be made by the method disclosed by Searle in U.S. Patent No. 2,444,536, issued July 6, 1948, and by Arnold and Searle in U.S. Patent No. 2,462,835, issued March 1, 1949. They described many of the monomaleimides named in the present working examples. The following monomaleimides, believed to be new, also can be made by their process.

| Product: | Melting point, ° C. |
|---|---|
| N-4-anisylmaleimide | 151–4. |
| N-4-acetylphenylmaleimide | 157.5–60.0. |
| N-2,4-xylylmaleimide | 74.5–7.0. |
| N-2,6-xylylmaleimide | 108.0–9.2. |
| N-2-chlorophenylmaleimide | 57.5–9.0. |
| N-3-chlorophenylmaleimide | 87.0–9.5. |
| N-isopropylmaleimide | About 23 (B.P. 70–3/5 mm.). |
| N-4-t-butylphenyl maleimide | 98–9. |

The N-alkylmaleimides also can be made merely by heating the corresponding N-alkylmaleamic acid in vacuo.

Several N-alkylmaleimides are described by Beilstein (4th ed.), vol. 21.

The monocitraconimides used in this invention are made by the same methods by which the corresponding maleimides are made. Many of the citraconimides are described by Beilstein, loc. cit. Some typical monocitraconimides are citraconimide itself, N-isopropylcitraconimide, N-phenylcitraconimide, the N-(chlorophenyl)citraconimides, N-(2,4-dinitrophenyl)citraconimide, the N-tolylcitraconimides, the N-naphthylcitraconimides, and the N-(methoxyphenyl)citraconimides.

Monomaleimide, monocitraconimide, and the N-substituted derivatives thereof having but one imido N atom can be used according to the invention in widely varying amounts. However, we prefer to use from about 0.25 to about 6.0 parts of the curing agent per 100 parts of the rubber. It is understood that the term "curing agent" includes both a single compound and a mixture of two or more compounds as defined above, and the term "rubber" includes both a single rubber and a mixture of two or more rubbers to be defined below.

The rubbers which are operable in this invention are the natural and the synthetic rubbers which have high olefinic unsaturation and which are conventionally vulcanized with sulfur. Such synthetic rubbers are the homopolymers of aliphatic conjugated diolefin hydrocarbons and copolymers of such diolefins with monoolefinic compounds copolymerizable therewith by emulsion polymerization methods. Such monoolefins include styrene; alpha-methylstyrene; p-methylstyrene; alpha, p-dimethylstyrene; acrylic and methacrylic nitriles, amides, acids and esters; vinyl pyridines; fumaric esters; methylenemalonic esters; vinylidene chloride; methyl vinyl ketone; and methyl isopropenyl ketone. Mixtures of such monoolefinic compounds can also be copolymerized with the diolefin. The term "high olefinic unsaturation" here connotes an amount of unsaturation on the order of that occuring in Hevea rubber. The copolymers must contain copolymerized therein at least about 35% of the diolefin hydrocarbon. The butyl rubbers, which are elastomers made by an ionic polymerization process, from a major amount of an isoolefin and a minor amount of a conjugated diolefin hydrocarbon in an oragnic solvent, are not curable with maleimides, and are excluded from the scope of the invention.

The satisfactory operation of this invention does not require a filler when the rubber is natural or Hevea rubber. In the case of a single synthetic rubber or a mixture of two or more synthetic rubbers, it is important to employ a filler, the minimum quantity thereof being well known to those skilled in the art of rubber compounding. Generally, we use at least 10 parts by weight of filler per 100 parts by weight of rubber, although this minimum is not critical and can be reduced in most cases without destroying the desirable physical characteristics of the vulcanizate.

The preferred fillers are the carbon blacks and the hydrated silicas. However, other fillers conventionally used in the rubber industry also are operable in our invention. Such fillers are titanium dioxide, clay, whiting, etc. Of course, the physical properties of the vulcanizates will vary considerably depending on the kind of filler used, as also is well known to anyone skilled in rubber compounding. So far as vulcanization is concerned, the maximum amount of filler is not critical. Those skilled in the art will understand that the practical maximum is that figure at which the physical properties of the vulcanizate begin to fall off objectionably.

We prefer to use butadiene-1,3, as the conjugated diolefin hydrocarbon in the synthetic homopolymers and copolymers, but other conjugated diolefin hydrocarbons which contain as many as six carbon atoms may be used, e.g., isoprene, piperylene, and 2,3-dimethylbutadiene.

The styrene/butadiene copolymer rubbers used in our invention are conventionally termed "SBR," in accordance with A.S.T.M. recommendations.

Among the acrylic-type monomers which may be used in making copolymer rubbers to be cured by the method of the invention are acrylonitrile; methacrylonitrile, acrylic acid and its alkyl esters, e.g., methyl acrylate, ethyl acrylate, butyl acrylate, and 2-ethylhexyl acrylate; methacrylic acid and its alkyl esters; acrylamide, N-monoalkylamides, N-monoaralkylacrylamides, N-diaralkylacrylamides. The most important of these monomers is acrylonitrile, the corresponding diolefin:acrylonitrile elastomers being conventionally now called "NBR,"

sold commercially under the names "Paracril," "Hycar," etc.

Typical vinylpyridines are 2-vinylpyridine, 3-vinylpyridine, 4-vinylpyridine, 2-methyl-5-vinylpyridine, 5-ethyl-2-vinylpyridine, 2-methyl-6-vinylpyridine, 2-ethyl-4-vinylpyridine, etc.

Among the fumarates are the symmetrical and unsymmetrical alkyl esters of fumaric acid, e.g., diethyl fumarate, ethyl methyl fumarate.

Among the methylenemalonic esters are the esters with an alkanol, more specifically diethyl methylenemalonate, diisopropyl methylenemalonate, di-n-butyl methylenemalonate, diisobutyl methylenemalonate, dimethyl methylenemalonate, etc. Unsymmetrical esters also can be used.

The synthetic rubber, filler, and curing agent of the present invention, together with any other desired materials such as accelerators of the type described below, plasticizers, antioxidants, and other conventional rubber compounding ingredients, are intimately mixed in any convenient manner used in the rubber industry, e.g., on a rubber mill or in an internal mixer.

The temperature of mixing can vary between 160° and 275° F. depending upon the amount and kind of filler, and the type of mixing equipment. The compounded rubber is then converted to any desired shape and size, and is vulcanized at temperatures from 200° F. to 400° F. for from 2 minutes to 8 hours depending on the size and shape of the article being cured. Cures may be made in any well-known way as in a mold under pressure or in an open container in an oven.

A further feature of our invention comprises the addition of general purpose thiazole-type accelerators, such as 2-mercaptobenzothiazole, 2,2'-dibenzothiazyl disulfide, and the benzothiazolesulfenamides, such as N-oxydiethylene - 2-benzothiazolesulfenamide and N-cyclohexyl-2-benzothiazolesulfenamide. These vulcanization accelerators, when added to the rubbers, vulcanizing agent and filler mixtures, greatly increase the rate of vulcanization induced by the monomaleimides and monocitraconimides. In many cases, the time of vulcanization can be reduced to one-half or even less by this acceleration. Alternatively, at the operator's convenience, the time can be kept constant and the temperature decreased below that used to obtain an equivalent cure without an accelerator.

The amount of accelerator can usefully range from 0.25 part to 2.0 or more parts.

The vulcanization procedure of the present invention has many advantages over previously known vulcanizing processes. Among these are the following:

(1) The rubber stocks vulcanized by the new process of our invention have a far better resistance to oxidative aging than does rubber vulcanized with sulfur. For example, when aged in air at 100° C., the new stocks of our invention deteriorate much less rapidly than a standard sulfur stock. Thus, these new stocks are especially useful in products which must operate for considerable periods of time at high temperatures. Such products are tires, curing bags for tires, rubber motor mountings, steam hose, gaskets and belts for hot machinery, conveyor belts for moving hot materials, flexible hot air ducts, hot water bottles, etc.

(2) The new stocks of the present invention may be used in contact with metals such as copper, silver, etc. which are tarnished by stocks vulcanized by sulfur. The advantages of using these new non-sulfur vulcanizates for rubber-metal objects, e.g., composite rubber and metallic cloth or fabric articles, rubber-insulated wire, headlights, silverware, copperware, etc. are obvious.

(3) The compounded but unvulcanized stocks made in accordance with the principles of our invention can be processed at higher temperatures without scorching than can stocks containing sulfur as the vulcanizing agent. This is particularly advantageous when mixing compounded rubber in large batches in Banbury mixers, usually operated at quite high temperatures, and when shaping articles by injection molding.

The following examples illustrate the invention. All parts are by weight.

Example 1

Example 1 illustrates the gist of the invention, i.e., the practical cure of the highly unsaturated rubber-like commercial SBR with monomaleimides. A masterbatch in the proportion of 100 parts of commercial SBR comprising butadiene and styrene in the ratio 76:24 and made at 5° C., and 50 parts of carbon black was made in a Banbury internal mixer. Portions of the masterbatch were mixed on a rubber mill with various maleimides to form the stocks below. The stocks were cured as shown in molds under pressure. After the cured stocks had returned to room temperature they were tested conventionally to determine extent of cure. The tensile strength and elongation were measured on a Scott tensile tester, the modulus on an autographic stress-strain tester.

| Stock | 1 | 2 |
|---|---|---|
| Masterbatch | 150 | 150 |
| Maleimide | 2 | |
| N-phenylmaleimide | | 2 |
| PHYSICAL PROPERTIES | | |
| A. Cured 60 min. at 166° C.: | | |
| Tensile strength (p.s.i.) | 250 | 430 |
| Elongation (percent) | 630 | 620 |
| 200% modulus (p.s.i.) | 130 | 150 |
| 300% modulus (p.s.i.) | 170 | 220 |
| B. Cured 60 min. at 195° C.: | | |
| Tensile strength (p.s.i.) | 800 | 1,090 |
| Elongation (percent) | 670 | 600 |
| 200% modulus (p.s.i.) | 210 | 270 |
| 300% modulus (p.s.i.) | 330 | 440 |

The above example shows that monomaleimides cure SBR. It also shows that modulus and tensile strength properties are improved markedly by increasing the temperature of vulcanization.

Example 2

Example 2 demonstrates that it is possible to accelerate the monomaleimide cure of a highly unsaturated rubber using a thiazole-type accelerator. The following stocks were mixed, cured, and tested as in Example 1.

| Stock | 3 | 4 |
|---|---|---|
| Masterbatch (see Ex. 1) | 150 | 150 |
| Maleimide | 2 | |
| N-phenylmaleimide | | 2 |
| 2-mercaptobenzothiazole | 2 | 2 |
| PHYSICAL PROPERTIES | | |
| A. Cured 60 min. at 166° C.: | | |
| Tensile strength (p.s.i.) | 2,280 | 2,500 |
| Elongation (percent) | 600 | 520 |
| 200% modulus (p.s.i.) | 480 | 460 |
| 300% modulus (p.s.i.) | 710 | 900 |
| B. Cured 60 min. at 195° C.: | | |
| Tensile strength (p.s.i.) | 2,310 | 2,250 |
| Elongation (percent) | 460 | 380 |
| 200% modulus (p.s.i.) | 540 | 700 |
| 300% modulus (p.s.i.) | 980 | 1,280 |

The above example, by comparison with Example 1, shows the spectacular acceleration of the monomaleimide cures by means of an accelerator such as 2-mercaptobenzothiazole.

Example 3

Example 3 shows that it is possible to accelerate the monomaleimide cure of highly unsaturated rubbers using a thiazole disulfide accelerator.

A masterbatch in the proportion of 100 parts of SBR (described in Example 1), 50 parts of carbon black, and 5 parts of a hydrocarbon plasticizing oil was made in a Banbury. Portions of the Masterbatch were mixed on a mill with the materials shown individually to form the stocks shown below. They were cured at 153° C. for the times shown below and tested as in Example 1.

| Stock | 5 | 6 |
|---|---|---|
| Masterbatch | 155 | 155 |
| N-phenylmaleimide | 4 | 4 |
| 2,2'-dibenzothiazyl disulfide | 1 | 2 |
| PHYSICAL PROPERTIES | | |
| Tensile strength (p.s.i.)— | | |
| Time of cure (min.): | | |
| 30 | 2,870 | 3,030 |
| 45 | 2,870 | 2,950 |
| 60 | 2,850 | 2,890 |
| 90 | 2,980 | 2,800 |
| 180 | 2,970 | 2,940 |
| Elongation (percent)— | | |
| Time of cure (min.): | | |
| 30 | 640 | 500 |
| 45 | 570 | 480 |
| 60 | 530 | 450 |
| 90 | 520 | 570 |
| 180 | 510 | 530 |
| 300% modulus (p.s.i.)— | | |
| Time of cure (min.): | | |
| 30 | 730 | 850 |
| 45 | 830 | 980 |
| 60 | 900 | 1,050 |
| 90 | 980 | 1,130 |
| 180 | 1,100 | 1,330 |

This example shows by comparison with Example 1, that 2,2'-dibenzothiazyl disulfide is a powerful accelerator of cure for the monomaleimides.

*Example 4*

Example 4 demonstrates the cure of SBR rubber with N-alkylmaleimides in the presence of a thiazole-type accelerator.

A masterbatch in the proportion of 100 parts of SBR (described in Example 1) 40 parts of carbon black and 7.5 parts of a hydrocarbon plasticizing oil was made in a Banbury. Portions of the masterbatch were mixed on a mill with the materials shown individually to form the stocks shown below. They were cured at 153° C. for the times shown below and tested as in Example 1.

| Stock | 7 | 8 | 9 |
|---|---|---|---|
| Masterbatch | 147.5 | 147.5 | 147.5 |
| N-phenylmaleimide (0.023 mole) | 4.0 | | |
| N-ethylmaleimide (0.023 mole) | | 2.9 | |
| N-isopropylmaleimide (0.023 mole) | | | 3.2 |
| 2,2'-dibenzothiazyl disulfide | 2.0 | 2.0 | 2.0 |
| PHYSICAL PROPERTIES | | | |
| Tensile strength (p.s.i.)— | | | |
| Time of cure (min.): | | | |
| 22 | 2,240 | 1,280 | 1,090 |
| 45 | 2,190 | 2,230 | 1,960 |
| 90 | 2,330 | 2,140 | 2,350 |
| Elongation (percent)— | | | |
| Time of cure (min.): | | | |
| 22 | 630 | 770 | 790 |
| 45 | 430 | 710 | 600 |
| 90 | 440 | 600 | 670 |
| 300% modulus (p.s.i.)— | | | |
| Time of cure (min.): | | | |
| 22 | 700 | 325 | 325 |
| 45 | 1,125 | 650 | 625 |
| 90 | 1,275 | 700 | 675 |

The above example shows that N-alkylmaleimides, when accelerated with a conventional thiazole-type accelerator like 2,2'-dibenzothiazyl disulfide, will cure highly unsaturated rubbers such as SBR. On a molar basis, the N-alkylmaleimides appear to be slower curing agents than the N-arylmaleimides.

*Example 5*

Example 5 demonstrates that the successful operation of this invention is not limited to the inclusion of a single filler like carbon black.

The following stock was mixed on a mill, cured at 145° C., and tested as shown in Example 1.

| Stock | 10 |
|---|---|
| SBR | 100 |
| Titanium dioxide | 40 |
| Clay | 70 |
| Hydrocarbon plasticizing oil | 5 |
| N-phenylmaleimide | 4 |
| 2,2'-dibenzothiazyl disulfide | 2 |
| PHYSICAL PROPERTIES | |
| Tensile strength (p.s.i.)— | |
| Time of cure (min.): | |
| 30 | 500 |
| 45 | 690 |
| 60 | 830 |
| Elongation (percent)— | |
| Time of cure (min.): | |
| 30 | 1,220 |
| 45 | 1,130 |
| 60 | 1,050 |
| 300% modulus (p.s.i.)— | |
| Time of cure (min.): | |
| 30 | 140 |
| 45 | 170 |
| 60 | 230 |

The above example shows that fillers other than carbon black, for example clays and/or pigments, can be used in this invention.

*Example 6*

Example 6 further demonstrates the operation of this invention using substituted N-arylmaleimides as curing agents.

A masterbatch in the proportion of 100 parts of SBR, 50 parts of carbon black, and 8 parts of hydrocarbon plasticizing oil, was made in a Banbury. Portions of the masterbatch were mixed on a mill with equimolar amounts of various maleimides to form the stocks shown below. The stocks were cured at 145° C. and tested as in Example 1.

| Stock | 11 | 12 | 13 |
|---|---|---|---|
| Masterbatch | 158 | 158 | 158 |
| N-phenylmaleimide | 4 | | |
| N-p-anisylmaleimide | | 4.7 | |
| N-4-acetylphenylmaleimide | | | 4.98 |
| 2,2'-dibenzothiazyl disulfide | 2 | 2 | 2 |
| PHYSICAL PROPERTIES | | | |
| Tensile strength (p.s.i.)— | | | |
| Time of Cure (min.): | | | |
| 30 | 1,970 | 1,730 | 1,590 |
| 45 | 2,190 | 2,190 | 1,780 |
| 60 | 2,180 | 2,230 | 1,780 |
| 120 | 2,260 | 2,050 | 1,890 |
| Elongation (Percent)— | | | |
| Time of Cure (min): | | | |
| 30 | 540 | 510 | 480 |
| 45 | 460 | 480 | 420 |
| 60 | 430 | 430 | 390 |
| 120 | 380 | 360 | 380 |
| 300% modulus (p.s.i.)— | | | |
| Time of Cure (min.): | | | |
| 30 | 810 | 800 | 850 |
| 45 | 1,130 | 1,190 | 1,150 |
| 60 | 1,340 | 1,360 | 1,320 |
| 120 | 1,650 | 1,550 | 1,480 |
| Torsional hysteresis (138° C.) measured per the method of the Gerke et al. Patent 2,118,601— | | | |
| Time of Cure (min.): | | | |
| 30 | 0.137 | 0.134 | 0.154 |
| 45 | 0.109 | 0.113 | 0.134 |
| 60 | 0.105 | 0.102 | 0.126 |
| 120 | 0.095 | 0.099 | 0.120 |

This example has shown that the phenyl group of the N-arylmaleimide curing agent can have substituents on it.

*Example 7*

Example 7 demonstrates the operation of this invention with a wide variety of substituted N-arylmaleimides in conjunction with a thiazole-type accelerator like 2,2'-dibenzothiazyl disulfide.

The following stocks were mixed, cured at 145° C., and tested as in Example 1 except that the masterbatch contained 52 parts of carbon black and 0.35 parts of N,N'-diphenyl-p-phenylene diamine as well as the oil. Specimens of each stock also were tested, like the green stocks, after aging for four days at 100° C. in circulating air. (Stocks 14–26 were mixed and cured as nearly simultaneously as equipment would allow, and all were aged simultaneously in the same oven.)

Example 8

All of the preceding examples, 1 to 7, illustrate the operation of this invention for the cure of SBR rubber. The following examples illustrate that other highly unsaturated rubbers are cured by the method of this invention. In particular, Example 8 illustrates the cure of natural rubber with N-arylmaleimides accelerated by

| Stock | 14 | 15 | 16 | 17 | 18 | 19 |
|---|---|---|---|---|---|---|
| Masterbatch | 160.35 | 160.35 | 160.35 | 160.35 | 160.35 | 160.35 |
| Zinc oxide | 3.0 | | | | | |
| Stearic acid | 1.0 | | | | | |
| 2-mercaptobenzothiazole | 0.6 | | | | | |
| Diphenylguanidine | 0.2 | | | | | |
| Sulfur | 2.0 | | | | | |
| N-2-nitrophenylmaleimide | | 4.9 | | | | |
| N-3-nitrophenylmaleimide | | | 4.9 | | | |
| N-4-nitrophenylmaleimide | | | | 4.9 | | |
| N-2-tolylmaleimide | | | | | | |
| N-3-tolylmaleimide | | | | | 4.2 | |
| N-4-tolylmaleimide | | | | | | 4.2 |
| N-2,4-xylylmaleimide | | | | | | |
| N-2,6-xylylmaleimide | | | | | | |
| N-4-phenethylmaleimide | | | | | | |
| N-2-chlorophenylmaleimide | | | | | | |
| N-3-chlorophenylmaleimide | | | | | | |
| N-1-naphthylmaleimide | | | | | | |
| 2,2'-dibenzothiazyl disulfide | | 2.0 | 2.0 | 2.0 | 2.0 | 2.0 |
| Time of aging (days) | 0 \| 4 | 0 \| 4 | 0 \| 4 | 0 \| 4 | 0 \| 4 | 0 \| 4 |
| PROPERTY | | | | | | |
| Tensile (p.s.i.)— Cure time (min.): | | | | | | |
| 90 | 2,680 \| 2,500 | 2,010 \| 2,130 | 2,110 \| 2,080 | 1,670 \| 1,630 | 2,610 \| 2,460 | 2,680 \| 2,600 |
| 180 | 2,480 \| 2,650 | 2,110 \| 2,200 | 2,270 \| 2,100 | 1,730 \| 1,920 | 2,690 \| 2,570 | 2,780 \| 2,620 |
| Elongation (percent)— Cure time (min.): | | | | | | |
| 90 | 390 \| 250 | 590 \| 520 | 620 \| 500 | 630 \| 510 | 490 \| 480 | 440 \| 400 |
| 180 | 350 \| 300 | 560 \| 480 | 570 \| 470 | 570 \| 510 | 470 \| 450 | 430 \| 370 |
| 300% mod. (p.s.i.)— Cure time (min.): | | | | | | |
| 90 | 1,480 \| 2,650 | 730 \| 1,100 | 730 \| 1,100 | 580 \| 830 | 1,130 \| 1,350 | 1,450 \| 1,630 |
| 180 | 1,730 | 900 \| 1,180 | 950 \| 1,250 | 730 \| 980 | 1,300 \| 1,480 | 1,550 \| 1,780 |

| Stock | 20 | 21 | 22 | 23 | 24 | 25 | 26 |
|---|---|---|---|---|---|---|---|
| Masterbatch | 160.35 | 160.35 | 160.35 | 160.35 | 160.35 | 160.35 | 160.35 |
| Zinc oxide | | | | | | | |
| Stearic acid | | | | | | | |
| 2-mercaptobenzothiazole | | | | | | | |
| Diphenylguanidine | | | | | | | |
| Sulfur | | | | | | | |
| N-2-nitrophenylmaleimide | | | | | | | |
| N-3-nitrophenylmaleimide | | | | | | | |
| N-4-nitrophenylmaleimide | | | | | | | |
| N-2-tolylmaleimide | | | | | | | |
| N-3-tolylmaleimide | | | | | | | |
| N-4-tolylmaleimide | | | | | | | |
| N-2,4-xylylmaleimide | 4.2 | | | | | | |
| N-2,6-xylylmaleimide | | 4.5 | | | | | |
| N-4-phenethylmaleimide | | | 4.5 | | | | |
| N-2-chlorophenylmaleimide | | | | 4.9 | | | |
| N-3-chlorophenylmaleimide | | | | | 4.7 | | |
| N-1-naphthylmaleimide | | | | | | 4.7 | |
| 2,2'-dibenzothiazyl disulfide | 2.0 | 2.0 | 2.0 | 2.0 | 2.0 | 2.0 | 5.1 / 2.0 |
| Time of aging (days) | 0 \| 4 | 0 \| 4 | 0 \| 4 | 0 \| 4 | 0 \| 4 | 0 \| 4 | 0 \| 4 |
| PROPERTY | | | | | | | |
| Tensile (p.s.i.)— Cure time (min): | | | | | | | |
| 90 | 2,680 \| 2,340 | 2,680 \| 2,490 | 2,370 \| 2,130 | 2,730 \| 2,490 | 2,820 \| 2,400 | 2,770 \| 2,360 | 3,220 \| 2,530 |
| 180 | 2,650 \| 2,320 | 2,880 \| 2,560 | 2,610 \| 2,290 | 2,880 \| 2,550 | 2,870 \| 2,470 | 2,820 \| 2,430 | 2,790 \| 2,530 |
| Elongation (percent)— Cure time (min): | | | | | | | |
| 90 | 560 \| 470 | 490 \| 450 | 610 \| 510 | 430 \| 370 | 490 \| 420 | 480 \| 410 | 460 \| 460 |
| 180 | 530 \| 460 | 480 \| 410 | 570 \| 490 | 410 \| 370 | 470 \| 420 | 440 \| 380 | 450 \| 440 |
| 300% mod. (p.s.i.)— Cure time (min): | | | | | | | |
| 90 | 930 \| 1,200 | 1,180 \| 1,380 | 730 \| 980 | 1,480 \| 1,700 | 1,150 \| 1,430 | 1,310 \| 1,530 | 1,210 \| 1,430 |
| 180 | 1,080 \| 1,300 | 1,360 \| 1,480 | 880 \| 1,130 | 1,500 \| 1,830 | 1,230 \| 1,550 | 1,400 \| 1,700 | 1,400 \| 1,580 |

Example 7 shows many N-arylmaleimides which are operable in this invention. The heat aging, i.e., resistance to stiffening, as shown by the modulus, of stocks 15–26 which illustrate this invention, is very much better than that of stock 14 which illustrates conventional sulfur cure.

2,2'-dibenzothiazyl disulfide.

The following stocks were mixed, cured at 145° C., and tested as in Example 1, except that the masterbatch consisted of Hevea rubber (smoked sheet) and carbon black in the proportion of 100:50.

| Stock | 27 | 28 | 29 | 30 |
|---|---|---|---|---|
| Hevea masterbatch | 150 | 150 | 150 | 150 |
| BLE [a] | 1.25 | 1.25 | 1.25 | 1.25 |
| 2,2'-dibenzothiazyl disulfide | 1.0 | 1.0 | 1.0 | 1.0 |
| N-phenylmaleimide (0.023 moles) | 4.0 | | | |
| N-p-tolylmaleimide (0.023 moles) | | 4.32 | | |
| N-p-anisylmaleimide (0.023 moles) | | | 4.7 | |
| N-4-acetylphenylmaleimide (0.023 moles) | | | | 4.98 |
| PHYSICAL PROPERTIES | | | | |
| Tensile strength (p.s.i.)— | | | | |
| Time of cure (min.): | | | | |
| 30 | 2,410 | 2,470 | 2,400 | 2,570 |
| 60 | 2,440 | 2,540 | 2,770 | 2,610 |
| 120 | 2,480 | 2,610 | 2,730 | 2,710 |
| Elongation (percent)— | | | | |
| Time of cure (min.): | | | | |
| 30 | 570 | 570 | 560 | 570 |
| 60 | 540 | 530 | 570 | 530 |
| 120 | 520 | 520 | 530 | 520 |
| 300% modulus (p.s.i.)— | | | | |
| Time of cure (min.): | | | | |
| 30 | 590 | 630 | 650 | 650 |
| 60 | 690 | 760 | 770 | 800 |
| 120 | 790 | 860 | 870 | 930 |

[a] Condensation product of diphenylamine and acetone.

The above example shows that carbon black reinforced natural rubber can be satisfactorily cured by the method of this invention using a variety of N-arylmaleimides.

*Example 9*

Example 9 illustrates the operation of this invention for the cure of a carbon black reinforced vinylpyridine/butadiene rubber with a variety of N-arylmaleimides. A masterbatch in the proportion of 100 parts of 2-methyl-5-vinylpyridine:butadiene rubber (25:75), 50 parts of carbon black, and 5 parts of hydrocarbon plasticizing oil was made in a Banbury. Portions of the masterbatch were mixed on the mill with the materials shown below to form stocks which were cured at 145° C. and tested as in Example 1.

| Stock | 31 | 32 | 33 | 34 |
|---|---|---|---|---|
| Masterbatch | 155 | 155 | 155 | 155 |
| 2,2'-dibenzothiazyl disulfide | 2.0 | 2.0 | 2.0 | 2.0 |
| N-phenylmaleimide | 3.9 | | | |
| N-p-tolylmaleimide | | 4.2 | | |
| N-p-anisylmaleimide | | | 4.6 | |
| N-2-chlorophenylmaleimide | | | | 4.7 |
| PHYSICAL PROPERTIES | | | | |
| Tensile strength (p.s.i.)— | | | | |
| Time of cure (min.): | | | | |
| 22 | 1,540 | 1,710 | 1,640 | 1,060 |
| 45 | 1,680 | 1,770 | 1,690 | 1,200 |
| 90 | 1,850 | 1,990 | 1,850 | 1,380 |
| Elongation (percent)— | | | | |
| Time of cure (min.): | | | | |
| 22 | 810 | 800 | 810 | 860 |
| 45 | 810 | 740 | 750 | 850 |
| 90 | 750 | 700 | 740 | 820 |
| 300% modulus (p.s.i.)— | | | | |
| Time of cure (min.): | | | | |
| 22 | 300 | 320 | 330 | 240 |
| 45 | 330 | 380 | 360 | 270 |
| 90 | 380 | 430 | 420 | 300 |

The above example shows that a vinylpyridine rubber can be cured by the method of this invention.

*Example 10*

Example 10 illustrates the operation of this invention with another type of reinforcing filler, a wet-precipitated silica.

The following stock was mixed on a mill, cured at 153° C., and tested as in Example 1.

| Stock | 35 |
|---|---|
| SBR (see Ex. 1) | 100.0 |
| Silica filler [a] | 55.0 |
| N-phenylmaleimide | 4.0 |
| 2,2'-dibenzothiazyl disulfide | 2.0 |
| PHYSICAL PROPERTIES | |
| Tensile strength (p.s.i.)— | |
| Time of cure (min.): | |
| 30 | 1,820 |
| 60 | 2,090 |
| 120 | 2,270 |
| Elongation (percent)— | |
| Time of cure (min.): | |
| 30 | 1,000 |
| 60 | 990 |
| 120 | 930 |
| 300% modulus (p.s.i.)— | |
| Time of cure (min.): | |
| 30 | 385 |
| 60 | 435 |
| 120 | 530 |

[a] Hi-Sil #233, wet precipitated silica filler marketed by Columbia Southern Chemical Corp.

The above example shows that other non-black reinforcing fillers such as the wet precipitated silicas can be used in this invention.

*Example 11*

Example 11 demonstrates that it is possible to use other types of general purpose thiazole accelerators to accelerate the monomaleimide cure of highly unsaturated rubbers.

A masterbatch in the proportion of 100 parts of SBR (described in Example 1), 50 parts of carbon black, and 8 parts of hydrocarbon plasticizing oil was made in Banbury mixer. Portions of the masterbatch were mixed on a mill with the materials shown individually to form the stocks shown below. They were cured at 153° C. for the time shown below and tested as in Example 1.

| Stock | 36 | 37 | 38 |
|---|---|---|---|
| Masterbatch | 158 | 158 | 158 |
| N-Phenylmaleimide | 4.0 | 4.0 | 4.0 |
| 2,2'-dibenzothiazyl disulfide | 2 | | |
| N-oxydiethylene-2-benzothiazolesulfenamide | | 2 | |
| N-cyclohexyl-2-benzo-thiazole-sulfenamide | | | 2 |
| PHYSICAL PROPERTIES | | | |
| Tensile strength (p.s.i.)— | | | |
| Time of cure (min.): | | | |
| 22 | 2,900 | 2,650 | 2,370 |
| 45 | 3,860 | 2,940 | 2,460 |
| 90 | 3,140 | 3,060 | 2,570 |
| Elongation (percent)— | | | |
| Time of cure (min.): | | | |
| 22 | 540 | 680 | 740 |
| 45 | 480 | 590 | 710 |
| 90 | 460 | 580 | 710 |
| 300% modulus (p.s.i.)— | | | |
| Time of cure (min.): | | | |
| 22 | 1,025 | 725 | 500 |
| 45 | 1,325 | 990 | 575 |
| 90 | 1,500 | 1,050 | 600 |

The above example demonstrates the accelerating effect of two other general purpose thiazole-type accelerators on the monomaleimide cure of a highly unsaturated rubber such as SBR.

*Example 12*

Example 12 illustrates that a practical cure of highly unsaturated rubber-like commercial SBR can be obtained with monocitraconimides. A masterbatch was prepared as in Example 1.

Portions of this masterbatch were mixed on a rubber mill with various citraconimides, such as citraconimide itself and N-phenylcitraconimide.

| Stock | 39 | 40 |
|---|---|---|
| Masterbatch | 150 | 150 |
| Citraconimide | 2 | |
| N-phenylcitraconimide | | 2 |

The stocks were cured under pressure and tested conventionally to determine the extent of cure. The physical characteristics, i.e., tensile strength, elongation, and modulus, were substantially similar to those obtained with stocks 1 and 2 of Example 1. These data show that SBR can be cured with monocitraconimides and that the physical properties of the rubber are improved by employing higher vulcanization temperatures.

Having thus described our invention, what we claim and desire to protect by Letters Patent is:

1. A process for vulcanizing highly unsaturated rubbers selected from the group consisting of homopolymers of aliphatic conjugated diolefin hydrocarbons having up to 6 carbon atoms, and heteropolymers of such diolefin hydrocarbons with copolymerizable monoolefinic compounds, said heteropolymers containing at least 35% of said diolefin hydrocarbon copolymerized therein, comprising heating at a temperature of from 200° F. to 400° F. for a period of from 2 minutes to 8 hours a mixture comprised of 100 parts by weight of the rubber, and from 0.25 to 6.0 parts by weight of a curing agent selected from the group consisting of maleimide, monocitraconimide, and the N-substituted derivatives thereof having but one imido N atom.

2. A process for vulcanizing highly unsaturated rubbers selected from the group consisting of homopolymers of aliphatic conjugated diolefin hydrocarbons having up to 6 carbon atoms, and heteropolymers of such diolefin hydrocarbons with copolymerizable monoolefinic compounds, said heteropolymers containing at least 35% of said diolefin hydrocarbon copolymerized therein, comprising heating at a temperature of from 200° F. to 400° F. for a period of from 2 minutes to 8 hours a mixture comprised of 100 parts by weight of the rubber, and from 0.25 to 6.0 parts by weight of a curing agent selected from the group consisting of monomaleimide, monocitraconimide, N-alkyl and N-aryl monomaleimides, and N-alkyl and N-aryl monocitraconimides.

3. A process for vulcanizing highly unsaturated rubbers selected from the group consisting of homopolymers of aliphatic conjugated diolefin hydrocarbons having up to 6 carbon atoms, and heteropolymers of such diolefin hydrocarbons with copolymerizable monoolefinic compounds, said heteropolymers containing at least 35% of said diolefin hydrocarbon copolymerized therein, comprising heating at a temperature of from 200° F. to 400° F. for a period of from 2 minutes to 8 hours a mixture comprised of 100 parts by weight of the rubber, and from 0.25 to 6.0 parts by weight of maleimide.

4. A process for vulcanizing highly unsaturated rubbers selected from the group consisting of homopolymers of aliphatic conjugated diolefin hydrocarbons having up to 6 carbon atoms, and heteropolymers of such diolefin hydrocarbons with copolymerizable monoolefinic compounds, said heteropolymers containing at least 35% of said diolefin hydrocarbon copolymerized therein, comprising heating at a temperature of from 200° F. to 400° F. for a period of from 2 minutes to 8 hours a mixture comprised of 100 parts by weight of the rubber, and from 0.25 to 6.0 parts by weight of N-phenylmaleimide.

5. A process for vulcanizing highly unsaturated rubbers selected from the group consisting of homopolymers of aliphatic conjugated diolefin hydrocarbons having up to 6 carbon atoms, and heteropolymers of such diolefin hydrocarbons with copolymerizable monoolefinic compounds, said heteropolymers containing at least 35% of said diolefin hydrocarbon copolymerized therein, comprising heating at a temperature of from 200° F. to 400° F. for a period of from 2 minutes to 8 hours a mixture comprised of 100 parts by weight of the rubber, and from 0.25 to 6.0 parts by weight of N-ethylmaleimide.

6. A process for vulcanizing highly unsaturated rubbers selected from the group consisting of homopolymers of aliphatic conjugated diolefin hydrocarbons having up to 6 carbon atoms, and heteropolymers of such diolefin hydrocarbons with copolymerizable monoolefinic compounds, said heteropolymers containing at least 35% of said diolefin hydrocarbon copolymerized therein, comprising heating at a temperature of from 200° F. to 400° F. for a period of from 2 minutes to 8 hours a mixture comprised of 100 parts by weight of the rubber, and from 0.25 to 6.0 parts by weight of N-3-chlorophenylmaleimide.

7. A process for vulcanizing highly unsaturated rubbers selected from the group consisting of homopolymers of aliphatic conjugated diolefin hydrocarbons having up to 6 carbon atoms, and heteropolymers of such diolefin hydrocarbons with copolymerizable monoolefinic compounds, said heteropolymers containing at least 35% of said diolefin hydrocarbon copolymerized therein, comprising heating at a temperature of from 200° F. to 400° F. for a period of from 2 minutes to 8 hours a mixture comprised of 100 parts by weight of the rubber, and from 0.25 to 6.0 parts by weight of N-1-naphthylmaleimide.

8. A process for vulcanizing a rubber which is a homopolymer of an aliphatic conjugated diolefin hydrocarbon having up to 6 carbon atoms, comprising heating at a temperature of from 200° F. to 400° F. for a period of from 2 minutes to 8 hours a mixture comprising 100 parts by weight of the rubber, and from 0.25 to 6.0 parts by weight of a curing agent selected from the group consisting of monomaleimide, monocitraconimide, N-alkyl and N-aryl monomaleimides, and N-alkyl and N-aryl monocitraconimides.

9. A process as in claim 8, wherein the unvulcanized rubbery reaction mass is admixed prior to heating with from 0.25 part to about 2.0 parts by weight of thiazole accelerator.

10. A process for vulcanizing a rubber which is a homopolymer of an aliphatic conjugated diolefin hydrocarbon having up to 6 carbon atoms, comprising heating at a temperature of from 200° F. to 400° F. for a period of from 2 minutes to 8 hours a mixture comprising 100 parts by weight of the rubber, from 0.25 to 6.0 parts by weight of N-phenylmaleimide as a curing agent, and from 0.25 to 2.0 parts by weight of mercaptobenzothiazole as an accelerator.

11. A vulcanizate comprising the heat-reaction product of 100 parts of rubber selected from the group consisting of homopolymers of aliphatic conjugated diolefin hydrocarbons having up to 6 carbon atoms and heteropolymers of such diolefin hydrocarbons with copolymerizable monoolefin compounds, said heteropolymers containing at least 35% of said diolefin hydrocarbon copolymerized therein, and from 0.25 to 6.0 parts of a curing agent selected from the group consisting of maleimide, monocitraconimide and N-substituted derivatives thereof having but one imido N atom.

12. A process for vulcanizing a rubber which is a homopolymer of an aliphatic conjugated diolefin hydrocarbon having up to 6 carbon atoms, comprising heating at a temperature of from 200° F. to 400° F. for a period of from 2 minutes to 8 hours a mixture comprising 100 parts by weight of the rubber, from 0.25 to 6.0 parts by weight of N-phenylmaleimide as a curing agent, and from 0.25 to 2.0 parts by weight of 2,2'-dibenzothiazyl disulfide as an accelerator.

13. A vulcanizate comprising the heat-reaction product of 100 parts of rubber selected from the group consisting of homopolymers of aliphatic conjugated diolefin hydrocarbons having up to 6 carbon atoms and heteropolymers of such diolefin hydrocarbons with copolymerizable monoolefinic compounds, said heteropolymers containing at least 35% of said diolefin hydrocarbon copolymerized therein, from 0.25 to 6.0 parts by weight of a curing agent which is a mono-imide compound selected from the group consisting of monomaleimide, monocitraconimide, N-alkyl and N-aryl monomaleimides, and N-alkyl and N-aryl monocitraconimides, and from 0.25 to 2.0 parts of thiazole accelerator.

14. A vulcanizate comprising the heat-reaction product of 100 parts by weight of rubber selected from the group consisting of homopolymers of aliphatic conjugated diolefin hydrocarbons having up to 6 carbon atoms and heteropolymers of such diolefin hydrocarbons with copolymerizable monoolefinic compounds, said heteropolymers containing at least 35% of said diolefin hydrocarbon copolymerized therein, and from 0.25 to 6.0 parts by weight of N-phenylmaleimide as a curing agent.

15. A vulcanizate comprising the heat-reaction product of 100 parts by weight of rubber selected from the group consisting of homopolymers of aliphatic conjugated diolefin hydrocarbons having up to 6 carbon atoms and heteropolymers of such diolefin hydrocarbons with copolymerizable monoolefinic compounds, said heteropolymers containing at least 35% of said diolefin hydrocarbon copolymerized therein, and from 0.25 to 6.0 parts by weight of N-ethylmaleimide as a curing agent.

16. A vulcanizate comprising the heat-reaction product of 100 parts by weight of rubber selected from the group consisting of homopolymers of aliphatic conjugated diolefin hydrocarbons having up to 6 carbon atoms and heteropolymers of such diolefin hydrocarbons with copolymerizable monoolefinic compounds, said heteropolymers containing at least 35% of said diolefin hydrocarbon copolymerized therein, and from 0.25 to 6.0 parts by weight of N-3-chlorophenylmaleimide as a curing agent.

17. A vulcanizate comprising the heat-reaction product of 100 parts of rubber selected from the group consisting of homopolymers of aliphatic conjugated diolefin hydrocarbons having up to 6 carbon atoms, heteropolymers of such diolefin hydrocarbons with copolymerizable monoolefin compounds, said heteropolymers containing at least 35% of said diolefin hydrocarbon copolymerized therein, a filler, and from 0.25 to 6.0 parts of a curing agent selected from the group consisting of maleimide, monocitraconimide and N-substituted derivatives thereof having but one imido N atom.

18. A vulcanizate comprising the heat-reaction product of 100 parts by weight of rubber selected from the group consisting of homopolymers of aliphatic conjugated diolefin hydrocarbons having up to 6 carbon atoms and heteropolymers of such diolefin hydrocarbons with copolymerizable monoolefinic compounds, said heteropolymers containing at least 35% of said diolefin hydrocarbon copolymerized therein, and from 0.25 to 6.0 parts by weight of N-1-naphthylmaleimide as a curing agent.

References Cited in the file of this patent

UNITED STATES PATENTS

| | | |
|---|---|---|
| 2,477,015 | Sturgis et al. | July 26, 1949 |
| 2,925,407 | Goldberg | Feb. 16, 1960 |
| 2,958,672 | Goldberg | Nov. 1, 1960 |